May 20, 1924.

A. NELSON 1,495,098

BOLL WEEVIL EXTERMINATOR

Filed May 11, 1923

Al Nelson
INVENTOR

BY Victor J. Evans
ATTORNEY

WITNESS:

May 20, 1924.

A. NELSON

BOLL WEEVIL EXTERMINATOR

Filed May 11, 1923 4 Sheets-Sheet 2

1,495,098

Al Nelson

INVENTOR

BY Victor J. Evans

ATTORNEY

WITNESS:

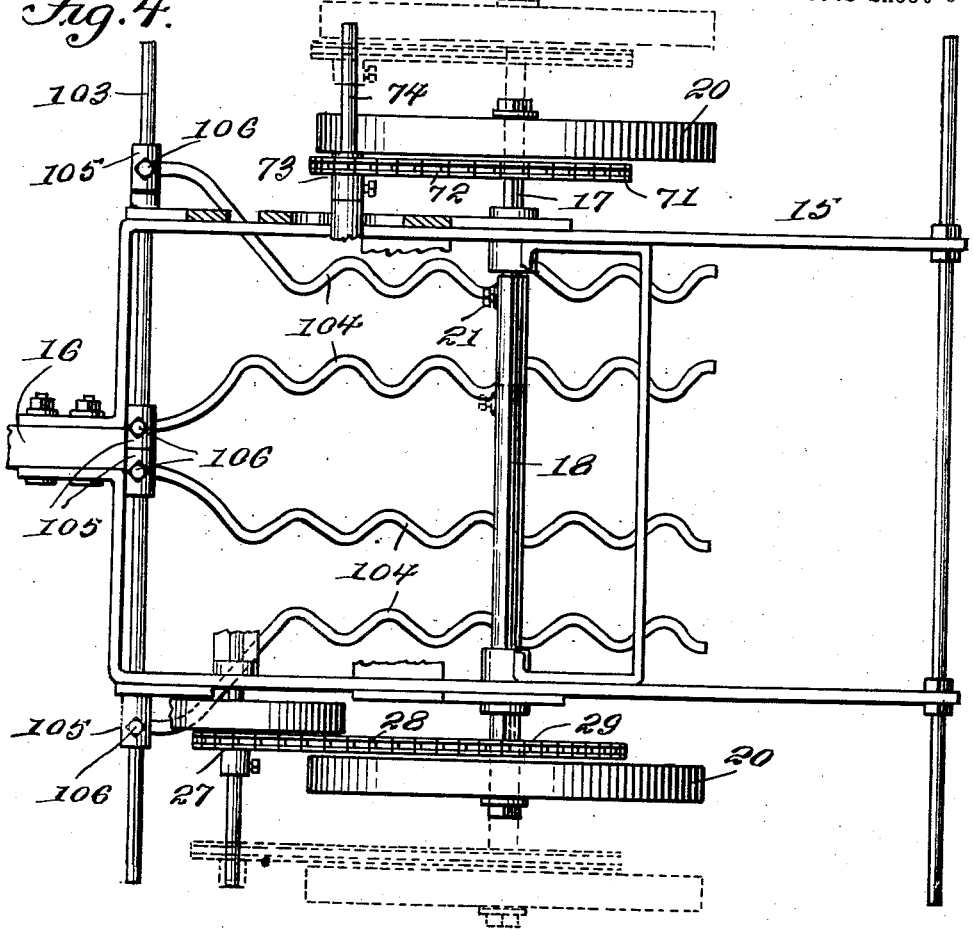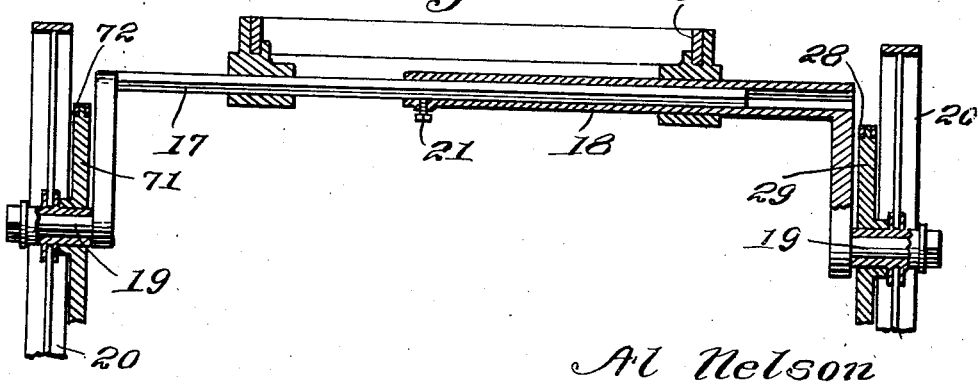

May 20, 1924.
A. NELSON
1,495,098
BOLL WEEVIL EXTERMINATOR
Filed May 11, 1923    4 Sheets-Sheet 4
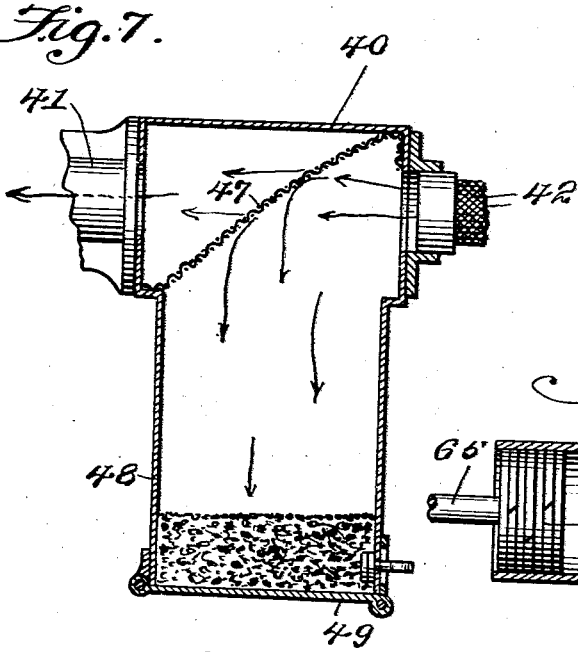
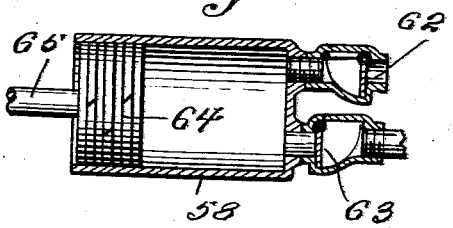
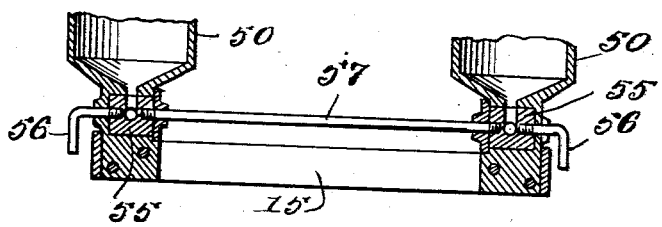
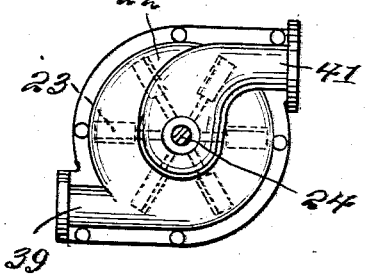
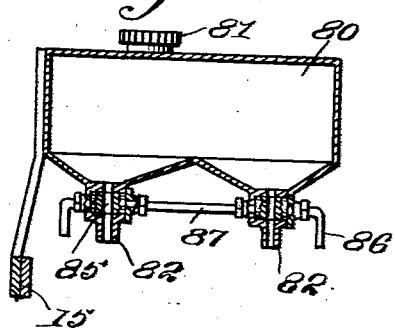
Al Nelson
INVENTOR
BY Victor J. Evans
ATTORNEY
WITNESS:

Patented May 20, 1924.

1,495,098

UNITED STATES PATENT OFFICE.

AL NELSON, OF RIPLEY, TENNESSEE, ASSIGNOR OF ONE-HALF TO A. F. WARD, OF MEMPHIS, TENNESSEE.

BOLL-WEEVIL EXTERMINATOR.

Application filed May 11, 1923. Serial No. 638,322.

*To all whom it may concern:*

Be it known that I, AL NELSON, a citizen of the United States, residing at Ripley, in the county of Lauderdale and State of Tennessee, have invented new and useful Improvements in Boll-Weevil Exterminators, of which the following is a specification.

This invention relates to insect destroyers and has for its object the provision of a machine which is capable of use for applying poison powder to rows of cotton or other plants and which is also provided with means for sucking up and collecting punctured squares, weevils and other débris.

An important object is the provision of a machine of this character which is provided with a fan driven by one of the wheels and operating to suck up the punctured squares and other matter, the other wheel operating to drive a selectively usable pump device for applying insecticide to the plants, either in liquid or powdered form, or for spraying the plants with water to make the subsequently blown powder adhere to the plants.

Another object is the provision of a device of this character which carries means for shaking the plants more or less violently for the purpose of knocking off the punctured squares or the like so that they may be subsequently gathered up by the suction mechanism.

Another object is the provision of a device of this character which will treat two or more rows at one time and which is so constructed as to be adjustable and convenient in use regardless of whether the rows be close together or far apart.

An additional object is the provision of a machine of this character which will be simple and inexpensive in manufacture, easy to control and operate, efficient and durable in service and a general improvement in the art.

With the above and other objects and advantages in view the invention consists in the details of construction to be hereinafter more fully described and claimed and illustrated in the accompanying drawings, in which:

Figure 4 is a plan view with portions omitted illustrating the drive mechanism and the shaking means, Figure 5 is a sectional view taken longitudinally of the axle, Figure 7 is a detail sectional view through the collecting receptacle.

Figure 8 is a longitudinal section through one of the pumps,

Figure 9 is a detail section on substantially the line 9—9 of Figure 3,

Figure 10 is a detail section on substantially the line 10—10 of Figure 3 and

Figure 11 is a detail view of the blower.

Figure 1:
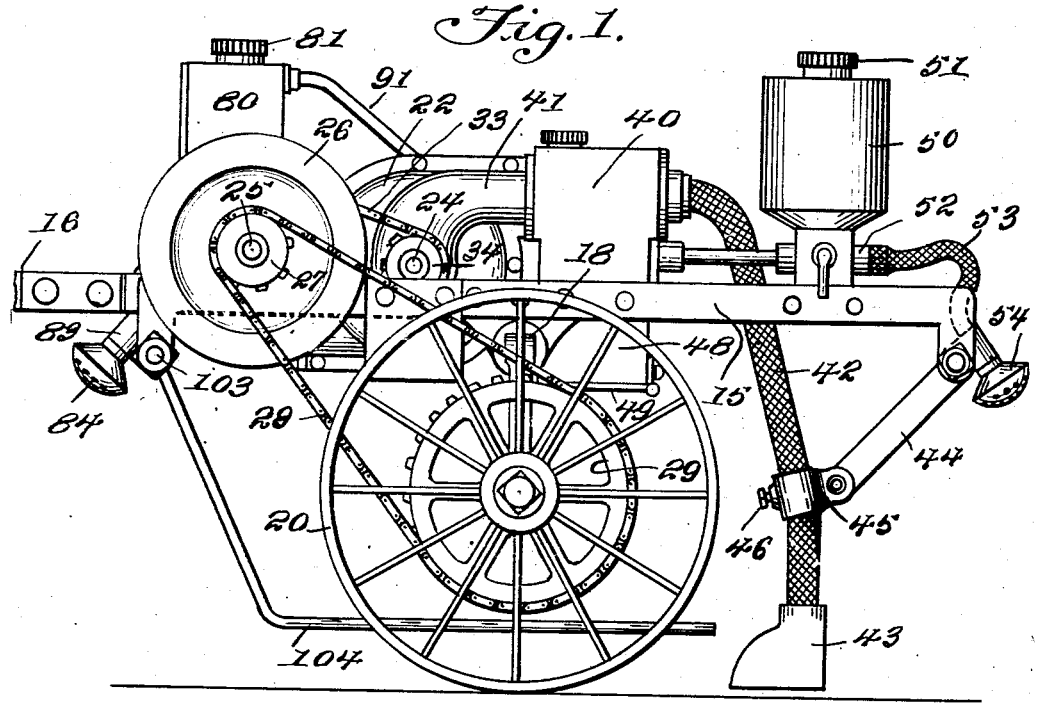
Figure 1 is a side elevation of the device.
Figure 2:
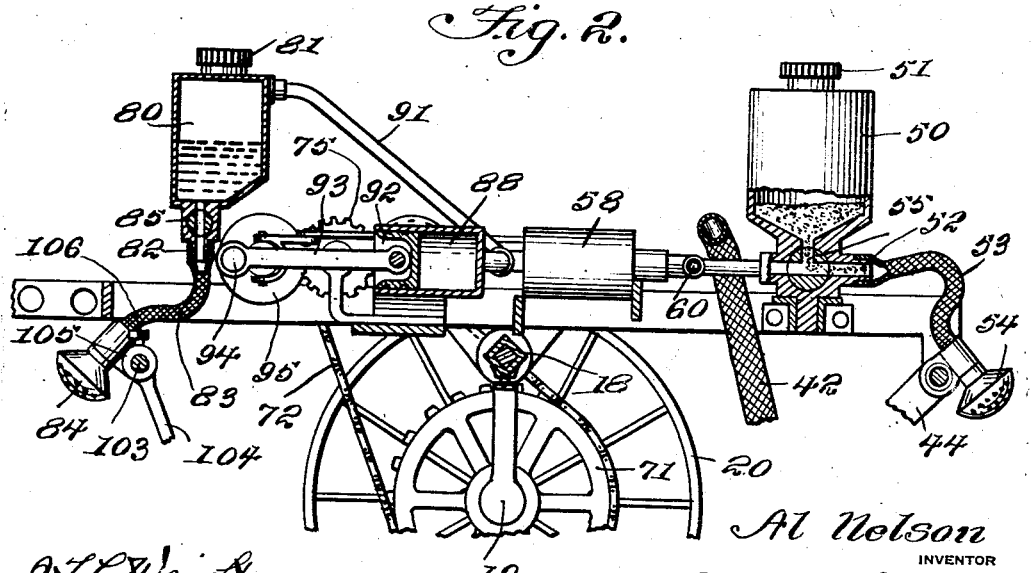
Figure 2 is a vertical longitudinal section.
Figure 3:
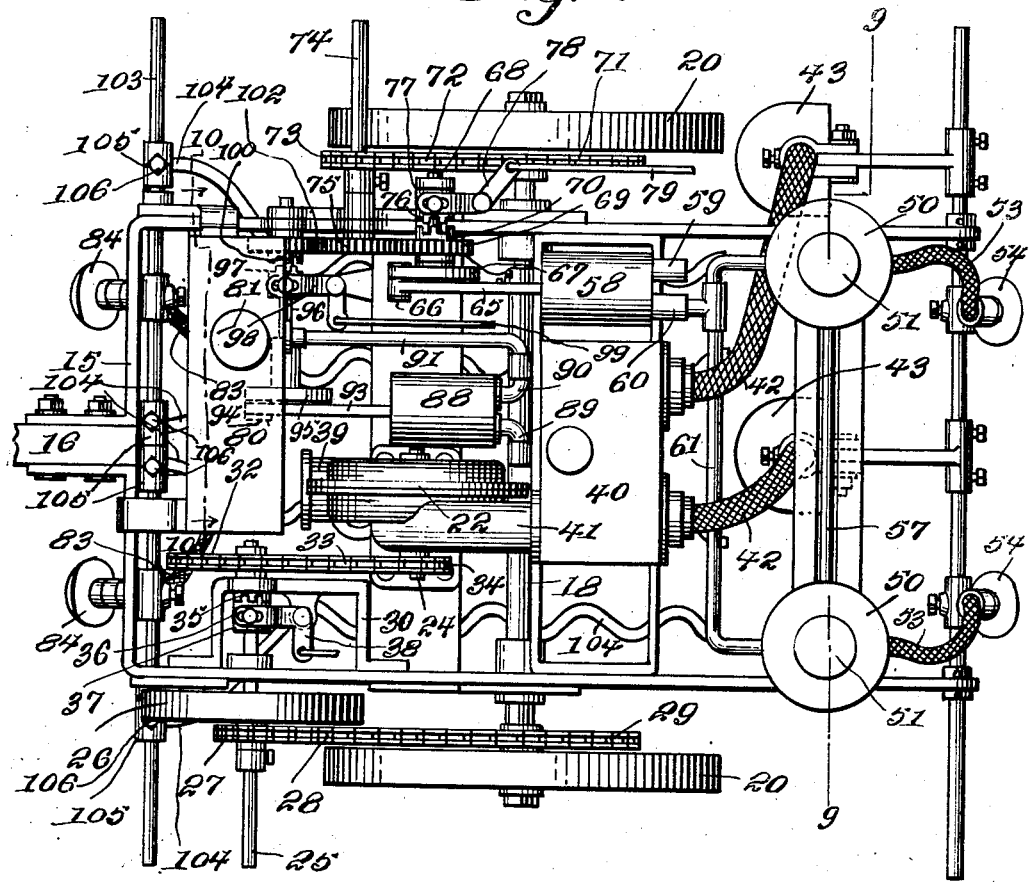
Figure 3 is a top plan view.
Figure 6:
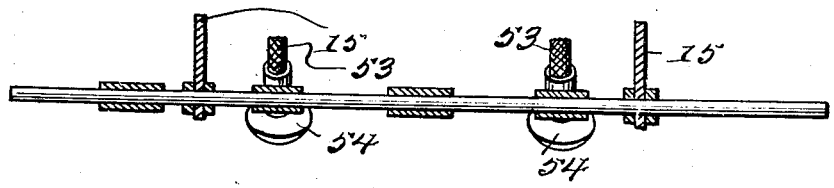
Figure 6 is a detail section.

Referring more particularly to the drawings I have shown the device as comprising a suitable supporting frame 15 constructed of angle iron or other suitable material and of any desired shape, this frame moreover including any necessary number of longitudinal and transverse bars suitably connected and reinforced if desired by any braces which may be needed. At one end this frame is provided with a draft tongue 16 by means of which the device may be drawn along the ground by means of draft animals, a tractor or the like. This frame is mounted upon an arched axle which includes telescopically engaged sections 17 and 18 which terminate in trunnions 19 on which are journaled ground engaging wheels 20. This arched axle may be adjusted to vary the distance between the wheels, the section 17 being slidable within and along the section 18 and the adjustment being maintained by means of a suitable set screw 21.

Mounted on some convenient portion of the frame 15 is a fan casing 22 within which is journaled a fan 23 of the centrifugal blower type, the fan being mounted upon a shaft 24. The drive means for this fan consists of a counter-shaft 25 suitably journaled on the frame and carrying a fly wheel 26 and a sprocket 27 about which is trained a chain 28 which is in turn trained about a sprocket 29 on one of the ground engaging wheels 20. Mounted on the frame is a suitable supporting bracket structure 30 through which the shaft 25 extends, and inwardly of this bracket the shaft carries a sprocket 32 having trained thereover a chain 33 which is in turn trained about a sprocket 34 on the shaft 24 of the blower. On the shaft 31 is a clutch member 35 adapted to be engaged by a clutch face 36 formed on a sleeve 37 splined on the shaft 35 and moved by means of an angle lever 38 equipped with any suitable means for effecting movement thereof to engage and disengage the clutch members 36 and 35. The fan casing is of course provided with an outlet 39 through which air is discharged into the atmosphere.

Mounted upon the frame 15 at some convenient location, preferably rearwardly of the fan casing, is a suction box 40 connected with the inlet 41 of the fan casing. Carried by this suction box is any desired number of depending flexible tubes 42 which terminate in suction nozzles 43 designed to be disposed immediately above the surface of the ground traveled over or to trail upon the ground if such be preferred. These hose or tubes 42 are here illustrated as being supported by links 44 mounted on the frame and carrying clamps 45 engaged upon the hose, the clamps being adjustably mounted along the hose and held in adjusted position by suitable set screws or the like 46.

Located within the suction box is a partition 47 of wire screen which extends diagonally across the box and which is for the purpose of preventing the matter drawn up through the tubes 42 from entering the fan casing. This suction box is prolonged downwardly as shown to provide a receptacle 48 within which weevils and punctured squares sucked up will accumulate, and it is preferable that the bottom of this receptacle be equipped with a movably mounted door 49 which may be easily opened to permit cleaning out of the accumulation of débris therein.

In order that the device may be used for applying a poison powder to the plants for killing any insects thereon, I provide tanks or receptacles 50 at some convenient location on the frame which tanks are provided with filling openings normally closed by caps 51. The bottoms of these tanks 50 are provided with outlets, designated by the numeral 52 and connected with these outlets are hose 53 terminating in discharge nozzles 54 of any preferred type, though they are here illustrated as being hollow shell like members provided with perforations. These outlets 52 are provided with cut off valves 55 equipped with suitable handles 56 by means of which the valves may be opened or closed at will and both valves are connected by a rod 57.

The operating means for applying the powdered poison consists of a pump 58 suitably mounted on the frame and having an air inlet 59 and an air outlet 60, the latter of which is connected with a branched pipe 61 which leads to both of the tanks or receptacles 50. This pump 58 is of course equipped with valves 62 and 63 located in the air inlet and exhaust, which valves are here illustrated as being of the flap type though it is of course to be understood that some other specific construction might be employed if preferred. This pump further includes a reciprocatory piston 64 carried by a piston rod 65 which is connected with a wrist pin 66 on a disk 67 rotatable on a shaft 68 and carrying a gear 69 and a clutch member 70. Secured upon the other ground engaging wheel 20 is a sprocket 71 about which is trained a chain 72 which is in turn trained about a sprocket 73 on a counter-shaft 74 which carries a gear 75 meshing with the gear 69. Splined upon the shaft 68 is a clutch member 76 grooved for receiving a collar 77 connected with an angle lever 78 which may be moved by a rod 79 operated by any desired means for throwing the clutch members 76 and 70 into or out of engagement. When these clutch members are engaged, it is quite apparent that the rotation of the ground engaging wheel will be imparted to the disk 67 so that the pump 68 will be actuated to blow out the poison powder contained within the receptacles 50.

In some instances it may be found that the plants are too dry to make the application of poison powder practical and in such an event it is necessary first to spray the plants with water so that the powder will stick. To accomplish this I provide a tank 80 having a suitable filling opening normally closed by a cap 81 and this tank is provided at its bottom with outlets 82 with which are connected outlet pipes 83 which terminate in suitable nozzles 84 for spraying the water on to the plants. The outlets 82 of the tank are equipped with valves 85 movable into open or closed position by means of handles 86 either of which may be operated as both valves are connected by a rod 87.

The operating means for spraying the water comprises a pump 88 suitably mounted on the frame and having a check valve inlet 89 and a check valve outlet 90, the latter being connected with the tank 80 by a pipe 91. The pump further includes a piston 92 carried by a piston rod 93 connected with a wrist pin 94 on a disk 95 carried by a counter-shaft 96 upon which is splined a clutch member 97 having a grooved collar connected with an angle lever 98. The angle lever may be moved by any suitable lever means, not shown, connected with a rod 99 whereby the clutch member may be shifted into and out of engagement with a similar clutch member 100 rotatable on the shaft 96 and carried by a gear 102 which meshes with the gear 75 so as to be constantly driven thereby.

In order to knock weevils and punctured squares off of the growing plants, I provide a rod 103 which is mounted transversely of the forward portion of the frame and secured to this rod is a plurality of downwardly and rearwardly extending arms 104 which may be adjusted if desired owing to the fact that they are carried by sleeves 105 mounted on the rod 103 and held in adjusted position by set screws 106. These arms 104 are arranged in spaced parallel relation and are serpentine or zigzag in shape, so that as the machine is drawn along with these rods engaging against opposite sides of the plants in a row the plants will be shaken violently from side to side which will naturally result in shaking off weevils and punctured squares.

In the operation of the device it is of course apparent that the suction fan is used for gathering up all the débris, which débris is collected within the receptacle 48 and subquently destroyed by any desired means. If desired at any time the spraying mechanism may be thrown into operation by engaging the clutch members 97 and 100 so that the plants will be sprayed with water prior to the application of the powdered poison which is applied by throwing the pump 58 into operation through engagement of the clutch members 70 and 76. Instead of spraying the plants with plain water and subsequently applying the powdered poison it is to be noted that insecticide in liquid form may be sprayed upon the plants directly, this being entirely optional with the user.

From the foregoing description and a study of the drawings it will be apparent that I have thus provided a simply constructed and easily operated and controlled machine which will efficiently perform its purpose and which will consequently greatly improve the crop of cotton or the like inasmuch as the removal of the weevils will promote healthy growth of the plants.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A boll weevil destroyer, a wheel supported frame, collecting means thereon, and means for knocking the weevils from the plants, comprising a rod mounted transversely at the forward end of the frame, and a plurality of shaker rods carried by said rod and including downwardly inclined portions terminating in horizontally disposed rear ends arranged in parallel relation to the ground, said rods being serpentine in shape with the serpentine portions thereof parallel throughout.

2. A boll weevil destroyer, a wheel supported frame, collecting means thereon, and means for knocking the weevils from the plants, comprising a rod mounted transversely at the forward end of the frame, and a plurality of shaker rods carried by said rod and including downwardly inclined portions terminating in horizontally disposed rear ends arranged in parallel relation to the ground, said rods being serpentine in shape with the serpentine portions thereof parallel throughout, the rods being carried by sleeves adjustable longitudinally upon the rod for varying the space between the rods.

3. In a machine of the character described, a receptacle containing insecticide powder, the bottom of the receptacle being formed with a body having a continuous bore therethrough, an outlet pipe at one end of the bore, means connected with the other end of the bore for forcing compressed air therethrough, and a rotatable valve intersecting the bore and having a passage communicating therewith and a branch passage communicating with the receptacle.

In testimony whereof I affix my signature.

AL NELSON.